I. YASSENOFF.
CAM SHAFT AND PROCESS OF MAKING THE SAME.
APPLICATION FILED MAR. 21, 1921.
1,390,949.
Patented Sept. 13, 1921.
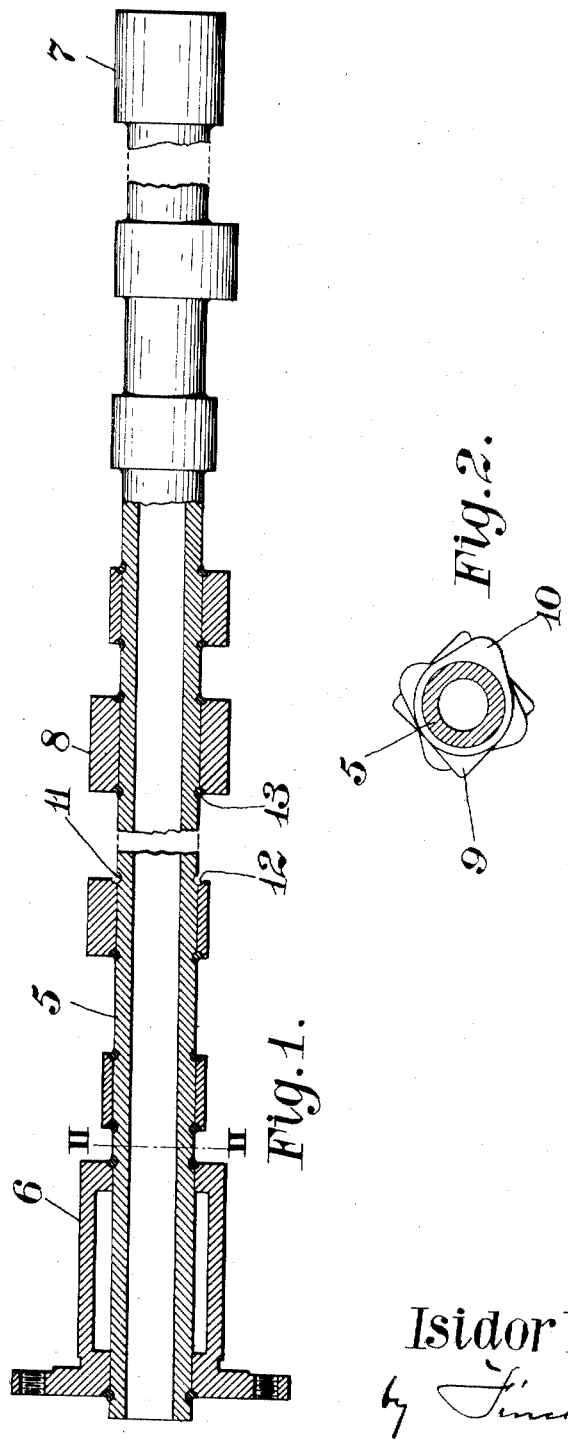
Inventor
Isidor Yassenoff
by Finkel & Finkel
his Attorney

UNITED STATES PATENT OFFICE.

ISIDOR YASSENOFF, OF COLUMBUS, OHIO, ASSIGNOR TO THE UNIVERSAL PARTS COMPANY, OF COLUMBUS, OHIO, A CORPORATION OF OHIO.

CAM-SHAFT AND PROCESS OF MAKING THE SAME.

1,390,949.      Specification of Letters Patent.      Patented Sept. 13, 1921.

Application filed March 21, 1921. Serial No. 453,928.

*To all whom it may concern:*

Be it known that I, ISIDOR YASSENOFF, a citizen of the United States, residing at Columbus, in the county of Franklin and State of Ohio, have invented a certain new and useful Improvement in Cam-Shafts and Processes of Making the Same, of which the following is a specification.

Heretofore the cam shafts of explosive engines have been made of steel both hollow and solid. They have been made hollow by boring to reduce weight and promote lubrication, but boring is an expensive operation. It is important in the manufacture of such shafts to have the cams and bearings hardened by tempering. Great difficulty and much loss has been occasioned by the fact that after carbonizing and tempering such shafts are found to be warped and in the attempt to straighten them they break. This breaking is due to brittleness of the shaft set up by the carbonizing and tempering process. It has been attempted to avoid tempering the shaft proper by copper-plating the parts not containing the cams and bearings but this is an expensive and troublesome remedy and not uniformly successful. The object of my invention is to avoid these difficulties and the invention consists in a general way in using an untempered drawn tube of soft steel for the body of the shaft and applying the duly carbonized or temperable bearings and cams thereto. The nature of the invention is best gathered from the details hereinafter set forth and finally claimed.

In the accompanying drawings—

Figure 1 is a combined side view and section of a cam shaft shortened by breaking it out in two places.

Fig. 2 is a cross section on the line II—II Fig. 1 looking to the right.

In the views 5 designates the body of the shaft, said body consisting as before stated of a tube of soft drawn steel. 6 and 7 designates the end bearings and 8 the center bearing. The cams, of which there are two varieties—intake and exhaust—are designated 9 and 10 respectively. To secure the bearings and cams to the shaft the latter is grooved annularly in line with each of the opposite faces of said members as shown at 11 and the members themselves are preferably concavedly chamfered around each of their bores as shown at 12 so as to produce annular pockets formed jointly by the chamfer and grooves. Each of these pockets is filled with Swedish iron as shown at 13 melted to a fluent or welding state thereby welding the members to the shaft body. Before applying the bearings and cam members they are carbonized and welded to the shaft and then the entire shaft is heated and quenched so that the cams and bearings are tempered while the shaft proper remains soft or untempered. If therefore the shaft should need straightening that can be done without fracture.

With my invention it will be noted that the expense of boring the shaft is entirely avoided and that a shaft which is amply strong and hard at the points desired is provided at comparatively small expense.

The forms and numbers of the parts can be changed without departing from the gist of the invention as claimed.

What I claim is:

1. A cam shaft comprising a non-tempered body portion having applied thereto temperable cams.

2. A cam shaft consisting of a normally untempered tubular body member having tempered cams welded thereto.

3. A cam shaft consisting of a tubular untempered member having temperable bearings and cams welded thereto.

4. The process of making a cam shaft consisting in welding a temperable cam to an untempered shaft body and subsequently tempering the cam.

5. The process of making a cam shaft consisting in welding a temperable cam to an untemperable shaft and then subjecting the combined cam and shaft to a tempering process for the purpose of tempering the cam.

6. The process of making a cam shaft consisting in welding a temperable cam to an untemperable tubular shaft and then subjecting the combined cam and shaft to a tempering process for the purpose of tempering the cam.

ISIDOR YASSENOFF.